(12) United States Patent
Mondet et al.

(10) Patent No.: US 6,485,261 B2
(45) Date of Patent: Nov. 26, 2002

(54) ROTARY-WING AIRCRAFT ROTORS WITH AUTOMATICALLY FOLDING BLADES AND ELECTRICAL CONNECTION INSTALLATION FOR THE BLADES

(75) Inventors: Jean Mondet, Pelissanne (FR); Stëphane Mazet, Rognac (FR)

(73) Assignee: Eurocopter, Marignane Cedex (FR)

( * ) Notice: Subject to any disclaimer, the term of this patent is extended or adjusted under 35 U.S.C. 154(b) by 0 days.

(21) Appl. No.: 09/992,260

(22) Filed: Nov. 19, 2001

(65) Prior Publication Data

US 2002/0081200 A1 Jun. 27, 2002

(30) Foreign Application Priority Data

Dec. 14, 2000 (FR) .............................. 00 16310

(51) Int. Cl.[7] .......................... B64C 27/39; B64C 27/50
(52) U.S. Cl. ..................... 416/95; 416/143; 244/134 D
(58) Field of Search ............................ 416/143, 146 R, 416/39, 95, 134 A, 141; 244/134 D; 219/201, 536, 549; 392/362; 338/214

(56) References Cited

U.S. PATENT DOCUMENTS

| 5,769,606 A | 6/1998 | Mondet et al. |
| 6,216,979 B1 | 1/2000 | Faure et al. |
| 2001/0051096 A1 * | 12/2001 | Potdevin ...................... 416/95 |

FOREIGN PATENT DOCUMENTS

DE 199 22153 11/2000

* cited by examiner

*Primary Examiner*—Christopher Verdier
(74) *Attorney, Agent, or Firm*—Henderson & Sturm LLP

(57) ABSTRACT

On the rotor, between each blade integral with its folding mount and the member for linking with the hub, an electrical connecting cable comprises a first section of which one part is held, in any position of the blade about the folding axis, above the mount and the radially outer end of the link member on which the mount pivots, in an off-centered position with respect to the folding axis and on the side towards which the blade is designed to be folded. This holding is provided by a cable support tied to the folding pivot and on which an arm, receiving the held part of this section of cable, is mounted in cantilever manner on the folding side.

13 Claims, 4 Drawing Sheets

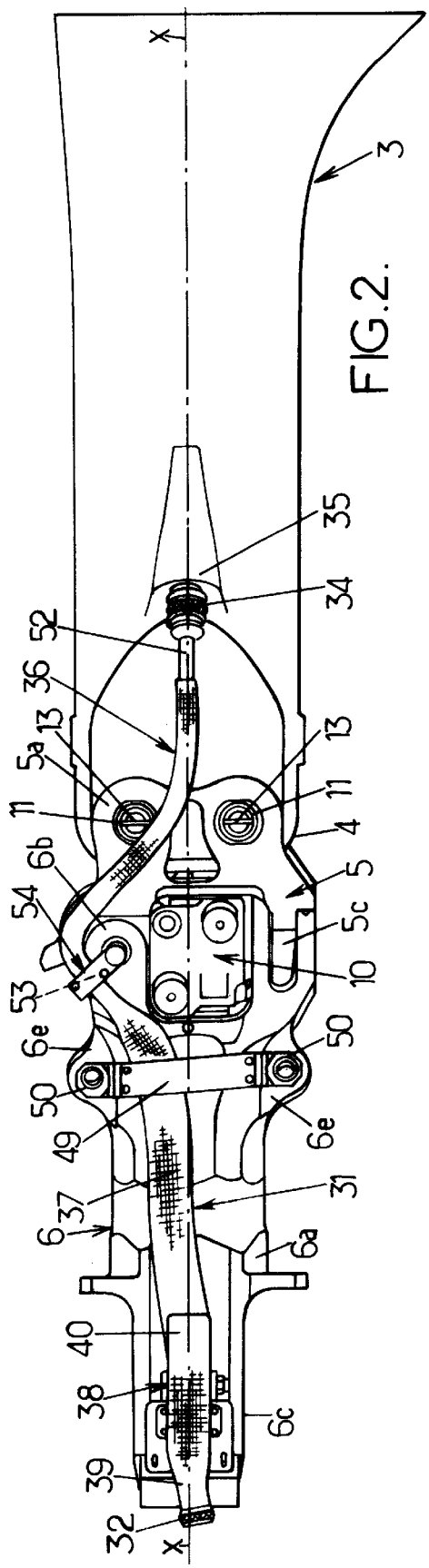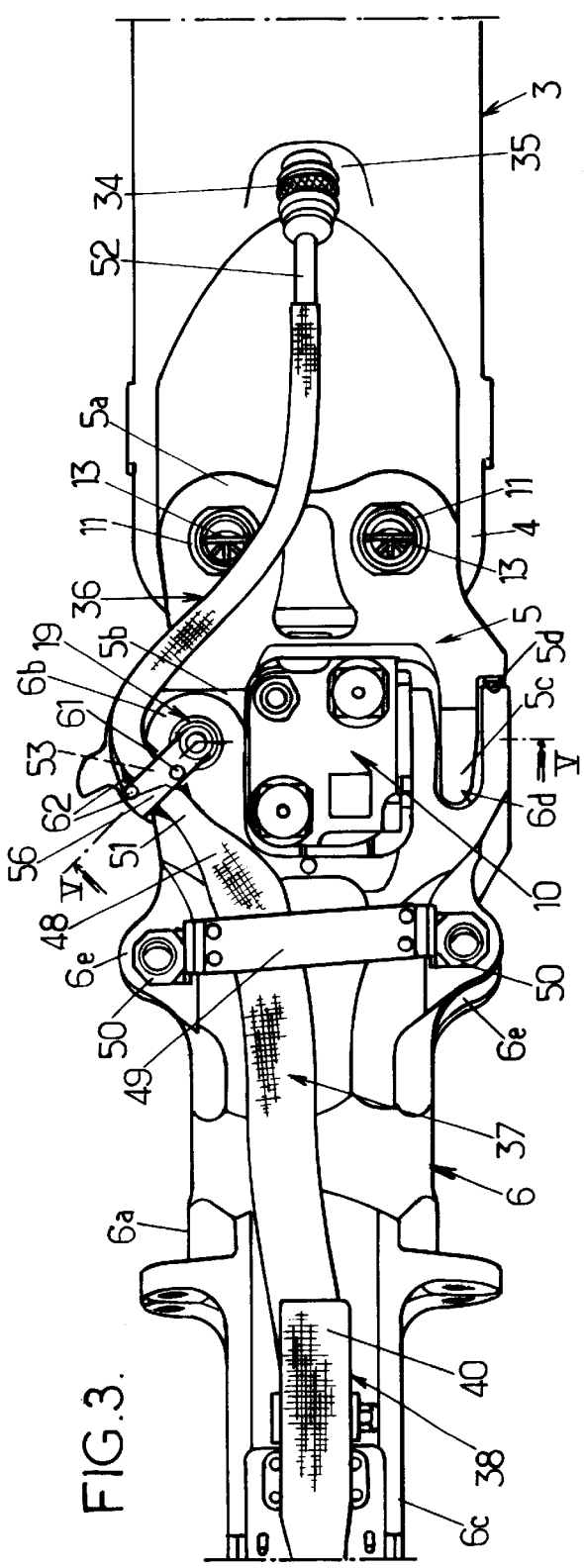

Figure 1:
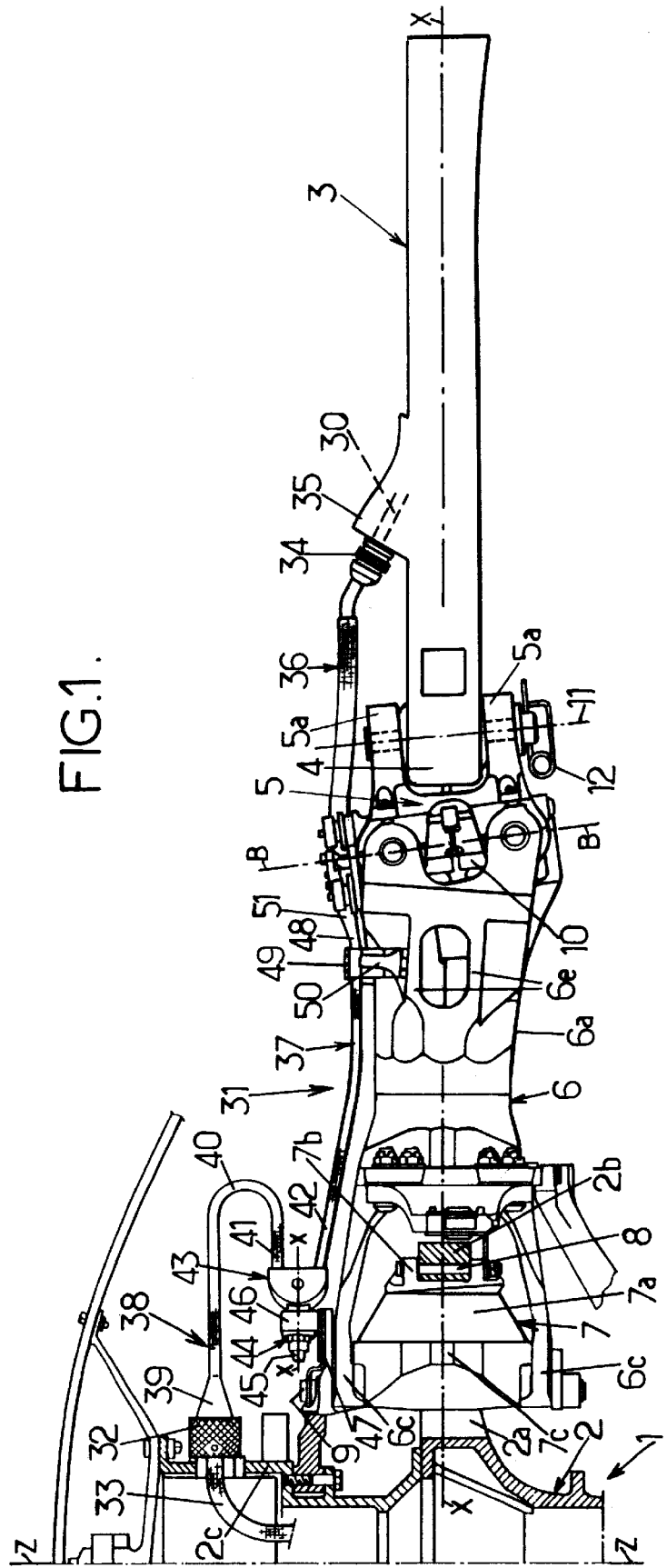

ROTARY-WING AIRCRAFT ROTORS WITH AUTOMATICALLY FOLDING BLADES AND ELECTRICAL CONNECTION INSTALLATION FOR THE BLADES

The invention relates to a rotary-wing aircraft rotor, whose blades are automatically foldable and equipped with electrical equipment, such as de-icing or anti-icing equipment, or even positioning lights or lamp(s) at the blade ends, or an electrical actuator to control a mobile member such as a blade flap, or any other electrical equipment requiring the routing of electrical energy to the blades from an electrical collector placed at the center of the hub of the rotor. This routing of electrical energy is provided by an electrical connection installation, essentially comprising an electrical harness comprising, for each blade, at least one electrical connecting cable, tied to a member for linking the corresponding blade to the hub of the rotor, and provided at its ends with connectors to ensure an electrical connection between the collector and the blade.

More precisely, the invention relates to a rotary-wing aircraft rotor, in particular a helicopter main rotor, of the type known in particular by EP-0 754 623 and FR 2 781 198 and comprising:
- a hub, designed to be driven in rotation about an axis of the hub which is the axis of rotation of the rotor,
- at least two blades, each of which is connected to the hub by a link member that is substantially radial with respect to the axis of rotation, each blade being firmly connected by its root to a folding mount, mounted in a pivoting manner at a radially outer end of the said link member, about an axis for folding the said blade between two positions, one of which is a flight position, in which the said mount is attached to the said link member in such a way that the said blade is substantially aligned in the projection of the said link member, and the other of which is a position folded along one side of the rotary-wing aircraft, in which the said mount and blade are pivoted about the said folding axis on one side of the said link member, and
- an electrical connection installation comprising, for each blade, at least one electrical connecting cable connecting a first connector, carried by the hub and electrically connected on the latter, to a second connector on the blade and connected to at least one electrical device of the said blade.

On a rotor according to EP 0 754 623, the connecting cable, for each automatically foldable blade, comprises (see FIGS. 7 and 13) a first section, radially towards the outside, arranged like an overhead hook and extending from this blade to the corresponding link member, and connecting the second connector on this blade to a rotating part, with which this first section is integral in rotation, of a rotating connector coaxial with the folding spindle about an extension of this spindle, and whose fixed part is connected, mechanically and electrically, to a first end, in a radially outer position, of a second section of connecting cable, held substantially radially on this link member. This overhead hook of the connecting cable has a rounded cross section, possibly an armoured structure, and is connected to the second connector, which is itself connected to the electrical equipment, for example de-icing or anti-icing equipment of this blade, and when an actuator housed in the corresponding link member commands the pivoting of the mount with the blade about the folding spindle, this first section of cable rotates with the rotating part of the rotating connector about this same spindle, at the same time as the blade, which makes any intervention on the second connector useless.

However, during the foldings of the blade, the pivoting of the blade with the mount with respect to the corresponding link member can introduce tensions that can cause damage in the overhead hook and on the rotating part of the rotating connector and also on the second connector, and such a rotating connector is furthermore a relatively complex, costly and fragile component.

In fact, it is not recommended to give this overhead hook a length sufficient to allow the complete folding of the blade whilst guaranteeing the absence of tensions, because an overhead hook of such length would have large forces applied to it and would be subjected to ample flutter movements, favouring its catching on or an unwanted collision with adjacent components, such as blade root pendular anti-vibration devices, aerodynamic dome, sleeve or drag dampers, on a rotor in rotation, on which the corresponding blade carries out angular deflections in pitch, flapping and drag.

FR 2 781 198 proposes improvements to rotors with automatically foldable blades and an electrical de-icing installation according to EP 0 754 623, in particular for avoiding the use of rotating connectors and reducing the stresses and/or displacements of the connecting cable in its overhead hook section connecting the link member to the second connector on the blade, when the rotor is rotating and during the operations of folding and unfolding the blades.

For this purpose, according to FR 2 781 198 (see FIGS. 3 and 4), an elongated part of this overhead hook, of substantially flattened rectangular cross section, whose biggest dimension is oriented substantially parallel with the axis of rotation of the rotor, is held in a member, mounted in a fixed manner or pivoting about the folding spindle, in the substantially axial projection of this folding spindle, and arranged as a fork in which the said elongated part of flattened cross section is engaged and held by at least one elastic tab. This retaining fork prevents the displacements of the overhead hook on either side of the folding spindle, during a blade's folding or unfolding, which prevents torsions harmful to this section of connecting cable, and is much more simple, economical and reliable than a rotating connector.

But the flattened rectangular cross section of this overhead hook section of cable above the link between the blade root and the link member favours a longitudinal slipping of the section of cable in the fork during the folding of the blade, and in particular generates a large aerodynamic drag, which causes a disturbing slipstream phenomenon. Furthermore, considering the angular movements, in particular of flapping and pitch combined, of this section of cable and of its mechanical link with the link member, when that latter and the blade are carrying out these angular movements, it has proved necessary to form recesses in the periphery of a profiled dome covering the rotor head, and this amplifies the said slipstream phenomenon.

The basic problem for the invention is to overcome these disadvantages whilst avoiding the use of rotating connectors, and avoiding the formation of a disturbing slipstream, caused by recesses in the profiled dome surmounting the rotor head and by a section of connecting cable with a flat profile oriented substantially parallel with the axis of the rotor.

For this purpose, the rotary-wing aircraft rotor according to the invention, of the type described above, is characterized in that the connecting cable comprises a first flexible section, of essentially cylindrical shape with a rounded cross section, preferably substantially circular, connecting the said second connector to a second section, held on the corresponding link member, of the said connecting cable, whose first section comprises a held part which, in all the positions of the blade about the folding spindle, is maintained fixed on a cable support tied to the said folding spindle, such that the said held part is maintained above the said mount and the said radially outer end of the said link member, in an off-centered position with respect to the said folding spindle and substantially on the folding side of the said blade, in order that the folding of the blade by pivoting about the said folding spindle causes the first section of cable to curve and to move naturally in order to accommodate itself to the said folding without extension of the said first section of cable.

The rounded shape of the cross section of the first section of cable sets up only a limited aerodynamic drag and allows, at the level of the connection with the second section of cable, a fixing much closer to the link member, such that it is no longer necessary to form recesses in a protective dome of the rotor head, or at the very least the dimensions of these recesses are limited to the minimum. Furthermore, no matter on which side of the helicopter the folding of a blade is carried out, the first section of connecting cable is held, in all blade configurations, by its part held on a point of the cable support which is not in the projection of the folding spindle, but offset with respect to the latter on the folding side, such that during the folding and unfolding of the blade the first section of cable can deform naturally without extension, and in particular can curve and move in such a way as to accompany the blade during its rotation without applying damaging tension to the second connector or to the rest of the connecting cable.

According to an advantageous, simple, economical and easily removable arrangement, the held part of the said first section of cable is held in a cradle, formed in the said cable support, by at least one collar fixed to at least one side of the cradle and brought down in the closed position onto the opposite side of the cradle, to which the collar is fixed, preferably in a detachable manner, by at least one fixing element in a position of maintaining the said held part between the cradle and the collar.

Advantageously, the cable support comprises a support arm, tied to the said folding spindle, and extending in a substantially radially protruding manner with respect to the said folding spindle and on the folding side of the said blade.

This support arm can be mounted in a fixed or pivoting manner on the folding spindle and, for this purpose, the cable support advantageously also comprises a support spindle, upon which the support arm is mounted in cantilever manner and which is itself mounted substantially coaxially at the end of the folding spindle, and held in a substantially axial direction with respect to the latter, by at least one holding member.

As a variant, at least the support arm is integrated with the first section of cable, at the level of the held part, and protruding laterally from this first section of cable, and the support arm is tied to the folding spindle, for example by the intermediary of the support spindle on which the support arm is mounted in cantilever manner.

When the automatic folding apparatus of each blade is such that at least the upper end of the folding spindle is tubular, as known from FR 2 742 726, it is then advantageous for the support spindle to be partly engaged axially and held, at least axially, inside the upper tubular end of the folding spindle.

In order to reduce the bulk of the cradle and of the collar, the cradle is preferably formed in the lower face of the said support arm, and the collar is disposed between the upper face of the radially outer end of the said link member and the said lower face of the said support arm against which the said collar is fixed.

Furthermore, the held part of the first section of cable can be advantageously delimited by at least one radial excess thickness of the said first section, preferably formed by over-moulding its outer cover, and preventing longitudinal sliding of the said held part with respect to the cradle and the collar.

Also advantageously, as known from EP 0 754 623 and FR 2 781 198, and for the reasons given in these two documents, the second section of cable has an elongated part of substantially flattened rectangular cross section, maintained substantially flat on the top of the said link member, that is to say such that the largest dimension of its cross section is oriented substantially perpendicular to the axis of the rotor, in particular in order to facilitate the fixing of this second section of cable on the link member, to reduce the aerodynamic drag and to attenuate the mechanical forces applied to this section of cable, which preferably furthermore extends in a direction laterally inclined with respect to the longitudinal axis of the said link member, on the folding side of the blade, in order to facilitate the connection of the first section of cable, to limit the length of the latter and to make its installation more favourable between the link member and the second connector.

Thus, the rotor according to the invention can also benefit from the advantages resulting from the use of other features of the electrical connection installation according to EP 0 754 623 and FR 2 781 198, to which reference can be made for more details, and whose descriptions are incorporated in the present description by way of reference.

In particular, the second section of cable can be advantageously connected to the first connector on the hub by the intermediary of a third section of the connecting cable, the said third section comprising an overhead hook, in the shape of a flattened half-loop, of substantially flattened rectangular cross section whose largest dimension is substantially perpendicular to the axis of rotation, and whose concavity is facing substantially towards holding and articulation means connecting the corresponding link member to the hub, and substantially radially towards the axis of rotation, the said overhead hook being thus deformable in flexion and torsion in order to accommodate itself to the angular deflections in pitch, drag and flapping of the blade and of its link member with respect to the hub, as known from the two documents mentioned above.

Similarly, the second section of cable can advantageously be connected to the overhead hook of the third section of cable by a joint connected to the link member by a link which is articulated at least in pivoting manner about an axis substantially parallel with or slightly inclined with respect to the longitudinal pitch change axis of the link member and of the blade, in order to attenuate the mechanical forces applied to the connecting cable whilst allowing a good take-up of the forces applied to the latter when the rotor rotates and the corresponding blade is carrying out its angular deflections in pitch, flapping and drag, as proposed in FR 2 781 198.

Figure 4:
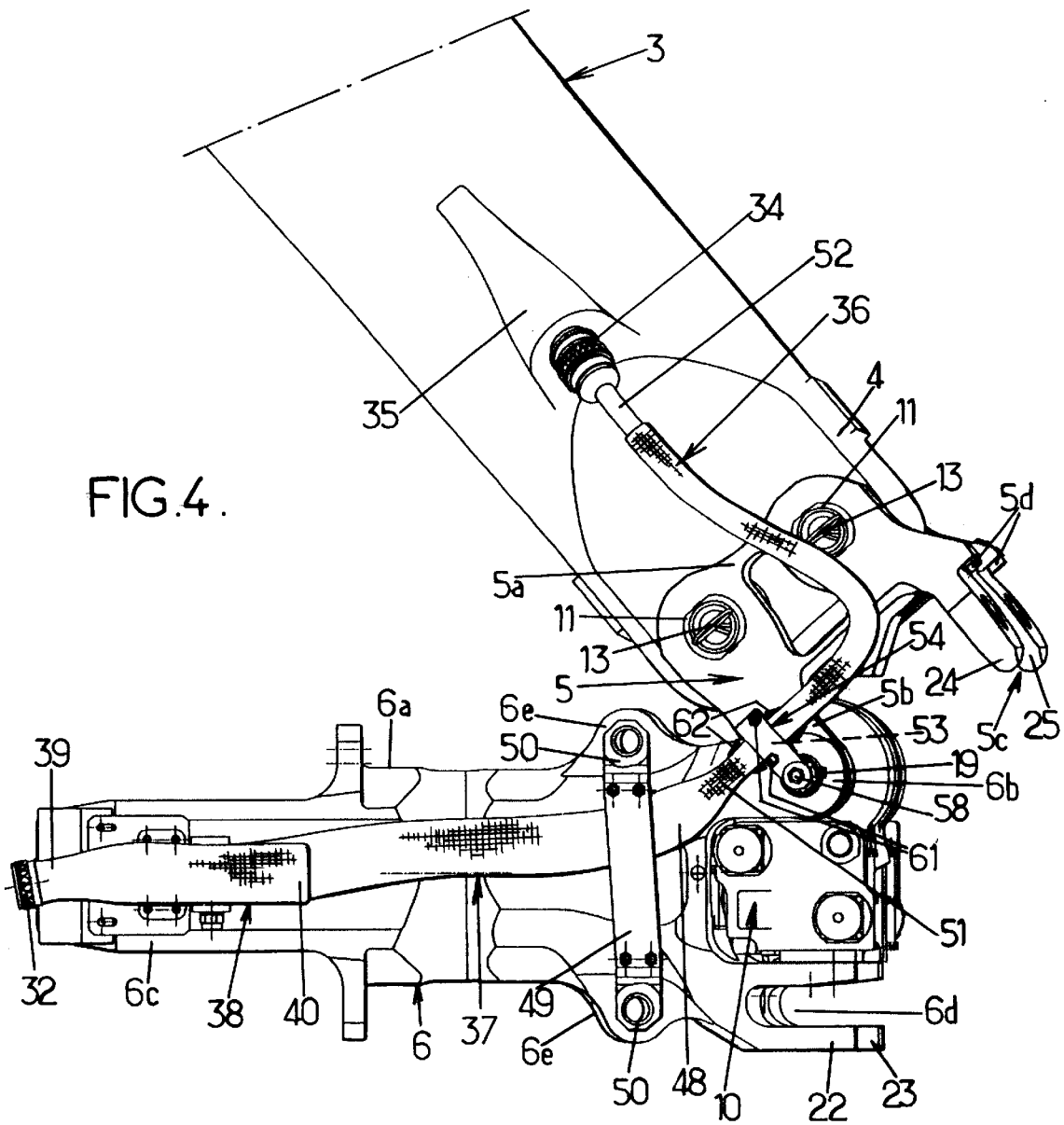
Figure 5:
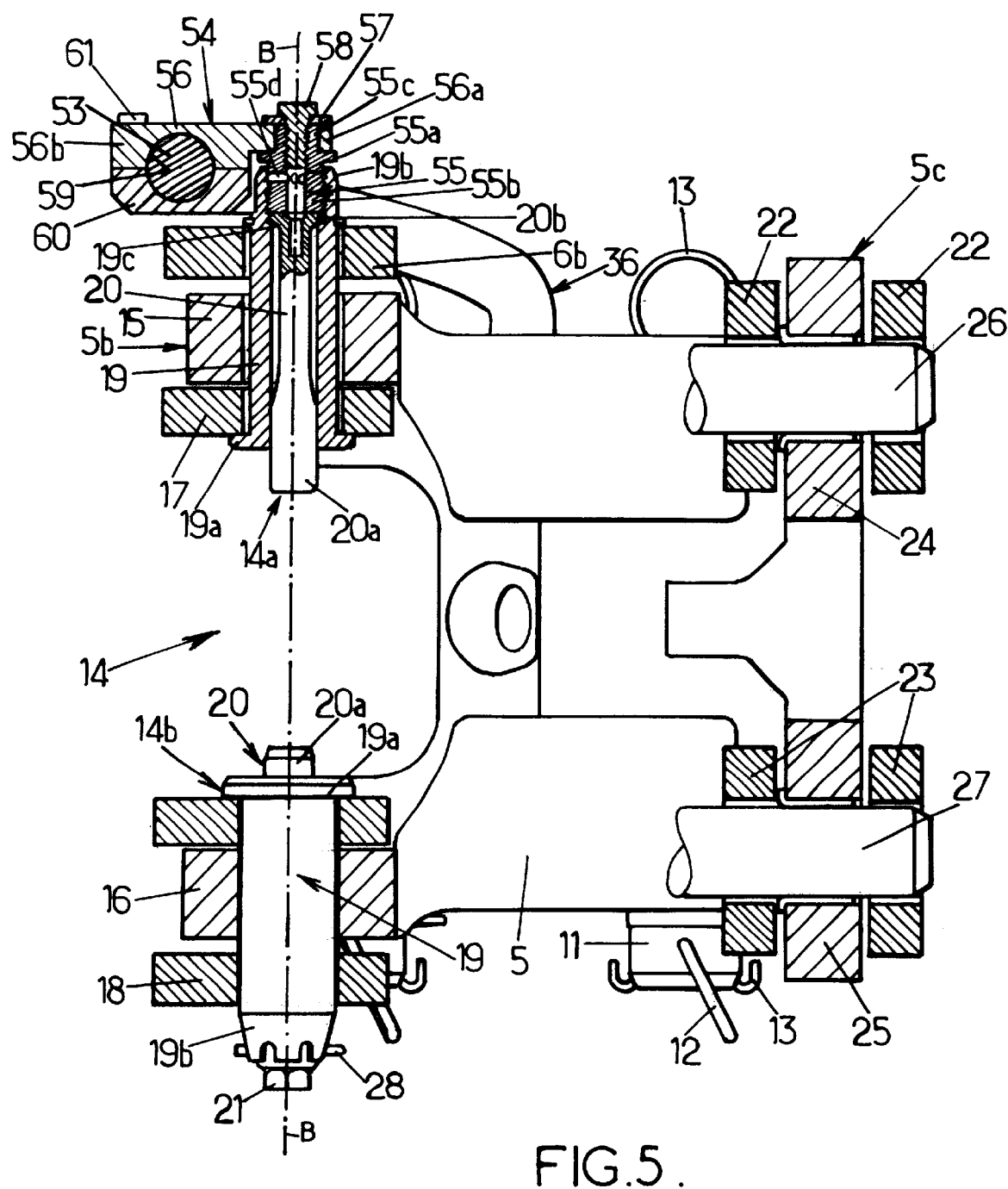

Other advantages and characteristics of the invention will emerge for the description given below, in a non-limitative manner, of a preferred example of embodiment, described with reference to the accompanying drawings in which:

FIG. 1 is a partial diagrammatic view, partly in cross section and partly in side elevation, of a rotor according to the invention, with automatically foldable blades, at the level of the link between a blade and the hub, in the flight position, and with the connecting cable associated with this blade in the electrical connection installation powering the electrical equipment, in particular the de-icing and/or anti-icing equipment of the blades of the rotor, FIG. 2 is a partial diagrammatic plan view of the rotor shown in FIG. 1, FIG. 3 is a partial diagrammatic view of a detail at a bigger scale than that of FIG. 2, FIG. 4 is a view corresponding to that of FIG. 3 but showing a blade in the folded position, and FIG. 5 is a view in broken cross section along the line V—V in FIG. 3, without an actuator.

FIGS. 1 to 3 show a main rotor of a helicopter, for example a four-blade rotor, with automatic folding of the blades and of the general type described in EP 0 754 623 and FR 2 781 198.

It is recalled that the rotor shaft 1 is integral in rotation with the hub 2 about an axis Z-Z of rotation of the rotor, which is the common axis of the shaft 1 and the hub 2. Each of the blades 3 has its root 4 fixed in a folding mount 5 mounted in a pivoting manner about a geometrical folding axis B-B, on a link member 6, referred to as a sleeve in the rest of the description, and which is itself connected to the hub 2 by a retaining and articulation device 7.

On the rotor shown in FIGS. 1 to 3, the hub 2 is of the recessed radial plate type having, for each blade 3, an axial recess 2a housing the retaining and articulation device 7, comprising a laminated spherical stop of a well known type, for withstanding in compression the centrifugal forces during the rotation of the rotor, and to allow the angular deflections of each blade 3 and of its sleeve 6 in pitch, about the longitudinal axis X-X of change of pitch of the blade 3 in question, in flapping about a flapping axis perpendicular to the axes Z-Z and X-X, and in drag about a drag axis perpendicular to the axis X-X and substantially parallel with the axis Z-Z, the axes of flapping, drag and pitch being concurrent at the center of the laminated spherical stop 7. This stop 7 comprises a central part 7a consisting of an alternated stack of rigid domes and of layers of an elastomer material, shaped like spherical caps whose concavity faces an external radial support 7b, by which the stop 7 is fixed, by bolts 8, to the radially outer edge 2b of the hub plate 2, at the level of the corresponding recess 2a. The stop 7 also comprises an internal radial support 7c, which traverses the recess 2a and is fixed as a cross-piece, by assemblies 9 with axial screws and nuts, between the two branches of a fork 6c to the radially inner end of the sleeve 6, whose central part 6a is substantially tubular around the longitudinal pitch change axis X-X, which is substantially radial with respect to the axis Z-Z. The outer radial end of each sleeve 6 is also designed, laterally on the side of the axis X-X towards which the blade 3 must be folded with the mount 5 with respect to the sleeve 6, as a fork 6b with parallel prongs between which a lateral bearing of the mount 5 is held in a pivoting manner about the geometric folding axis B-B.

The blade 3 with its mount 5 can thus be automatically folded and deployed with respect to its sleeve 6 linked with the hub 2 by means of an actuator 10 disposed on the sleeve 6, and causing the mount 5, with which the blade 3 is integral, to pivot on the sleeve 6.

Each blade 3 has its root 4 held in an outer fork 5a of the mount 5 by two blade pins 11, referenced only by their axis in FIG. 1, which can be of conventional structure, that is to say of generally cylindrical shape and of circular and tubular cross section, parallel with each other and symmetrical with each other on each side of the longitudinal axis X-X of the blade 3, the parallel axes of the pins 11 being slightly inclined towards the axis Z-Z of the rotor and upwards (see FIG. 1), each pin 11 traversing aligned bores in the blade root 4 and in the two prongs of the fork 5a. Each pin 11 bears by means of a collar at its upper end against the upper face of the upper prong of the fork 5a, whilst the lower end of each pin 11, protruding under the lower prong of the fork 5a, is traversed transversely by a first safety spring pin 12, and a second safety spring pin 13 furthermore axially traverses each pin 11 in a well-known manner. The safety pins 12 and 13 constitute detachable members maintaining the blade pins 11 in the position of retaining the blade root 4 in the fork 5a, and the withdrawal of the safety pins 12 and 13 from each pin 11 allows the withdrawal of the pins 11 for removing the blade 3.

The folding mount 5 is mounted in a pivoting manner in the lateral fork 6b of the radially outer end of the sleeve 6 and about the geometric folding axis B-B, laterally offset with respect to the axis X-X of the sleeve 6, by means of a cylindrical and lateral bearing 5b on one side of the radially inner part of the mount 5, this bearing 5b pivoting about an articulation axis or pivot 14 of the folding articulation, this pivot 14 being held in the fork 6b.

On the side of the axis X-X opposite the bearing 5b, the radially inner part of the mount 5 comprises a substantially vertical fork 5c, which faces the sleeve 6 and is housed in a housing 6d open radially towards the outside of the sleeve 6 and formed in the part of the radially outer end of this sleeve 6 which is on the side opposite the fork 6b with respect to the longitudinal axis X-X, in the position in which the mount 5 and the blade 5 are not folded by the actuator 10, that is to say in the flight position, in which the blade 3 and the mount 5 are maintained aligned in the substantially radial projection of the sleeve 6, by the locking of the fork 5c of the mount 5 in the housing 6d of the sleeve 6, by means of a locking stage of the actuator 10.

After unlocking and releasing the fork 5c in the housing 6d, the operation of the actuator 10, fixed to the sleeve 6 in its radially outer part, between the housing 6d and the fork 6b, causes the mount 5 and the blade 3 to pivot about the pivot 14, coaxial with the geometric folding axis B-B, on the side of the lateral fork 6b and of the lateral bearing 5b, in order to bring the blade 3 and the mount 5 into the folded position on this side, as shown in FIG. 4.

More precisely, the automatic folding device of the blade, with which the rotor of FIGS. 1 to 5 is equipped, is a device such as known from FR 2 742 726, which can be referred to for more information and which is incorporated in the present description by way of reference.

It is recalled that, according to FR 2 742 726, and as shown more particularly in FIGS. 3 to 5, the lateral bearing 5b of the mount 5 consists of two parallel parts of generally cylindrical shape, having an upper part 15 and a lower part 16, which are spaced along the geometric folding axis B-B, and the lateral fork 6b of the sleeve 6 is double and comprises two upper prongs forming an upper fork 17 and two lower prongs forming a lower fork 18, the two parts, upper 15 and lower 16, of the bearing 5b and the upper 17 and lower 18 forks being traversed by coaxial cylindrical bores of the same diameter, such that the upper part 15 and lower part 16 respectively of the bearing 5b are mounted in a pivoting manner in the upper fork 17 and lower fork 18 respectively of the sleeve 6 about the geometric folding axis B-B.

This is carried out (see FIG. 5) with the help of a folding axis or pivot 14 consisting of two substantially identical subassemblies mounted opposite each other, which are an upper subassembly 14a and a lower subassembly 14b, each comprising, on the one hand, a pin 19 held coaxially about the geometric folding axis B-B in the bores of the two prongs of the upper fork 17 and of the upper bearing part 15, for the upper subassembly 14*a*, and in the bores of the two prongs of the lower fork 18 and of the lower bearing part 16, for the lower subassembly 14*b*, and, on the other hand, a centering pin 20 which is calibrated and has a cylindrical end part 20*a* allowing the coaxial fitting of the pin 20 in the corresponding socket 19. Each of the subassemblies 14*a* and 14*b* of the folding pivot 14 is substantially as shown in FIG. 6 of FR 2 742 726 and comprises a cylindrical tubular socket 19, of circular cross section, whose internal and external diameters are calibrated from an end facing the other socket 19 and surrounded by a radially external shoulder 19*a*, up to the opposite end 19*b* whose external shape is that of a truncated cone converging at the end opposite to the shoulder 19*a*.

Each pin 20 is held axially in the corresponding socket 19 by a radially external shoulder 20*b*, at its end opposite to the cylindrical end-piece 20*a*, and by which the pin 20 is applied thrusting against a radially internal shoulder 19*c* through which a tapped bore, formed coaxially in the truncated cone-shaped end part 19*b*, is connected to the central bore of smaller diameter of the socket 19. As explained in FR 2 742 726, and as carried out in the lower subassembly 14*b* of the articulation pivot 14, the pin 20 is held applied by its shoulder 20*b* against the shoulder 19*c* of the socket 19 by a threaded bolt 21, screwed into the tapped bore of the truncated cone-shaped end part 19*b* of the socket 19, and such that an end part of the cylindrical end-piece 20*a* of the pin 20 protrudes axially from the socket 19, beyond its shoulder 19*a*, in order to serve as a centering end-piece, respectively in one of two corresponding centering housings formed on the opposite faces of a body (not shown in FIG. 5) facing which the two sockets 19 present their external radial shoulder 19*a* and which, as shown in FIGS. 2*a*, 3*a*, 3*b* and 4 of FR 2 742 726, is the lateral part of the body of a combined actuator for operating the mount 5 and the blade 3, by pivoting about the geometric folding axis B-B, and for locking the mount 5 in the flight configuration on the sleeve 6.

In order to lock the mount 5 in the flight position (FIGS. 1 to 3 and 5), the lateral housing 6*d* of the sleeve 6 which receives the lateral fork 5*c* of the mount 5 is delimited between the parallel and substantially vertical prongs of two locking forks, an upper one 22 and a lower one 23 (see FIG. 5) which are also lateral forks substantially protruding radially towards the outside on the radially outer end part of the sleeve 6, but whose prongs are oriented substantially in planes perpendicular to the prongs of the pivot forks 17 and 18 on the other side on the sleeve 6.

In a complementary way, the lateral fork 5*c* of the mount 5 consists of two lateral lugs, an upper one 24 and a lower one 25, which extend in planes substantially perpendicular to those of the bearing parts 15 and 16. Each of the lugs 24 and 25 is pierced with a transverse bore substantially of the same diameter as the coaxial bores pierced in the prongs of the forks 22 and 23, such that in the flight position each lug 24 or 25 is oriented towards the sleeve 6 and is lodged between the two prongs of the corresponding locking fork 22 or 23, in a position given by the actuator 10 in which eventually two stop-pieces 5*d* made of aluminium and laterally protruding outwards from the base of the lugs 24 and 25 of the fork 5*c*, come to bear against the ends (see FIGS. 3 and 4) of the outer prongs of the forks 22 and 23 of the sleeve 6, and the transverse bores of the lugs 24 and 25 are aligned and coaxial with the bores of the prongs of the forks 22 and 23. In this position, which is the one shown in FIG. 5, each lug 24 or 25 can be held in the corresponding locking fork 22 or 23 by a cylindrical locking spindle 26 or 27, shown diagrammatically in FIG. 5, traversing the aligned bores and retractable in the direction of its axis towards the folding pivot 14, in a stage, designed as a locking actuator, of the actuator body 10.

For the structure, the fitting and functioning of the actuator 10, in which one stage is designed as a motor-reduction unit operating as a rotary actuator in order to drive the blade 3 and the mount 5 in rotation about the geometric folding axis B-B, and in which a second stage is designed as a double locking actuator, as described above, reference can be made advantageously to FR 2 742 726 which describes the structure and the cooperation of the different parts of this actuator 10 with the sleeve 6 on the one hand and, on the other hand, with the mount 5 and the blade 3 in order to maintain the latter in the flight position or, after unlocking the lugs 24 and 25 in the forks 22 and 23, to control the rotation of the blade 3 and the mount 5 about the folding axis 14.

This conventional method of automatic folding of the blades 3 is used, on a four-blade rotor with two pairs of diametrically opposed blades immobilized in rotation, for the folding, in such a way that the longitudinal axes X-X of the blades are inclined by about 45° to the longitudinal axis of the helicopter: the front left blade and the rear left blade are folded on the left hand side and towards the rear of the helicopter (as shown in FIG. 4) whilst the front right blade and the rear right blade are folded on the right hand side and towards the rear of the helicopter, the direction of rotation being considered from the axis Z-Z of the rotor and starting from the radial direction of the longitudinal axis X-X of each blade in the flight position.

The structure and procedure for folding are here described only for a folding on the left hand side (FIG. 4), as a folding on the right hand side is enabled by folding apparatus which differs from the one described only by reversing the positions of the lateral fork 6*b* and of the housing 6*d* of the sleeve 6 and of their associated means, bearing 5*b* and fork 5*c*, of the mount 5, as described in FR 2 742 726 with reference to FIGS. 9*a* and 9*b*.

The rotor is equipped with an electrical connection installation for electrically powering electrical equipment, for example de-icing and/or anti-icing equipment, mounted on each blade 3, from the electrical system on board the helicopter, by means of a rotating collector (not shown) placed at the center of the hub 2.

The term electrical de-icing and/or anti-icing equipment should be understood to refer to any equipment necessitating an electrical power supply for its operation, command or control, such as de-icing or anti-icing equipment equipping each blade 3 and comprising an array of electrically conductive wires integrated in the blade 3, close to its leading edge, the radially inner end of this conductor array emerging on the upper surface of the blade 3, close to its root 4, substantially on the longitudinal axis X-X, in the form of a cable 30 grouping several long electrical conductors.

For each of the blades 3, this connection installation comprises an electrical connecting cable 31, comprising several elongated electrical conductors, substantially parallel with each other, embedded in an electrically insulating covering support, insulating the conductors from one another, and itself at least partially surrounded by a mechanically protective cover. This cable 31 is, at one end in the radially inner position, connected to a first connector 32, fixed to a central tubular support 2*c* which is itself fixed to the central part of the hub 2 and powered by an electrical power supply cable 33 connected to the collector, in such a way that the first connector 32 electrically connects the cable 31 to the power supply cable 33. At its other end, in the radially outer position, the cable 31 is connected to a second connector 34, mounted on a casing 35 fixed on the top of the blade root 4 and substantially centered on the axis X-X, and electrically connected to the cable 30 of the electrical de-icing and/or anti-icing conductors of that blade 3, in such a way that the cable 31 is electrically connected to this cable 30 by the second connector 34.

The connecting cable 31 essentially comprises three sections 36, 37 and 38, in succession, including a first, radially outward section 36, which connects the second conductor 34 to the second section of cable 37, in a radially intermediate position, and extending over the corresponding sleeve 6, on the top part of which the section 37 is held substantially at its two ends, this second section 37 being itself connected to the first connector 32 by the intermediary of the third, radially inner, section 38.

The third section 38 is produced essentially as described in EP 0 754 623 and FR 2 781 198, that is to say in the form of an elongated section of cable having a flattened rectangular cross section, whose largest side extends substantially perpendicular to the axis Z-Z and of which one end, in the radially inner position, is connected to the connector 32 by a joint 39 of varying cross section, whilst its radially outer part is folded back on itself in a flattened half-loop forming an overhead hook 40, whose concavity substantially faces radially towards the axis Z-Z and also towards the laminated spherical stop 7 attaching the sleeve 6 to the hub 2. This elongated part of the cable forming, in particular, the hook 40 can have a non-armoured structure like that of FIG. 2a of EP 0 754 623 and described with reference to that figure, with elongated parallel electrical conductors, spaced from one another and embedded in an insulating covering support which is elastically deformable (elastomer or natural rubber), this support being confined between two strips of cloth constituting the major faces of the section 38. This special structure and arrangement procure important advantages, mentioned in the above cited patents, in particular allowing this third section 38, and in particular its overhead hook 40, to deform in flexion and torsion in order to accommodate itself to angular deflections of the flapping mass constituted by the corresponding blade 3 and its sleeve 6, in pitch, flapping and drag, about the center of the spherical stop 7 and with respect to the hub 2.

Furthermore, the end 41 of the third section 38 which is opposite to the joint 39 is connected to the radially inner end 42 of the second section 37 essentially as described in FR 2 781 198, that is to say by an articulated support 43, forming a joint between the ends 41 and 42 of the two sections 38 and 37, and held on the sleeve 6 on which this support 43 is articulated by a link 44 which is at least pivoting about a geometrical axis x-x substantially parallel with the longitudinal axis X-X of the sleeve 6 of the corresponding blade 3, but able to be slightly inclined with respect to this longitudinal axis X-X. As described with reference to FIG. 1a of FR 2 781 198, this pivoting link 44 comprises the support 43 integral with one end of a pivot spindle 45, coaxial with the axis x-x and mounted in a pivoting manner, preferably with the interposition of a self-lubricating bearing, inside a coaxial sleeve 46 fixed to a plate 47 which is itself fixed, for example by screwing, to the upper prong of the fork 6c of the sleeve 6, at the level of the head locks of the axial screws of the assemblies 9 connecting the inner support 7c of the laminated spherical stop 7 in the radially inner fork 6c of the sleeve 6.

Thus, the joint-support 43, providing mechanical and electrical continuity between the ends 41 and 42 of the sections 38 and 37, is not stressed by the rotations of the sleeve 46 and of the plate 47 with the sleeve 6 about its pitch axis X-X.

This articulated link 44 of the joint-support 43 on the sleeve 6 procures the important advantages mentioned in FR 2 781 198, in particular that of improving the mechanical and electrical performance of the connecting cable 31, in particular by attenuating the mechanical forces applied to the third section of cable 38, as well as a good take-up of the forces applied to this section 38 when the rotor is rotating and the blade 3 is making, with the corresponding sleeve 6, angular pitch movements, at the pitch control frequency of the blades, which introduce torsional deformations with this frequency of the third section of cable 38. This articulated pivoting link 44 therefore ensures that the connecting cable 31 has a longer service life.

As a variant, as shown in FIG. 2 of FR 2 781 198, the articulated pivoting link 44 can be replaced by an articulated, ball-joint link, also in order to improve the accommodation of the hook 40 to the angular movements of the flapping mass (3–6) in drag and in flapping. In this case, a ball-joint can be held, on the one hand, about the spindle 45 with which the joint-support 43 is integral, and, on the other hand, inside the sleeve 46, in such a way as to allow not only the overall pivoting of the ends 41 and 42 with the joint-support 43 about the geometric axis x-x of the spindle 45, with respect to the sleeve 46 and the plate 47 integral with the sleeve 6, during the pitch movements of the latter, but also the overall pivoting of the ends 41 and 42 with this ball-joint, centered in a substantially radial plane passing through the axes Z-Z and X-X, when the sleeve 46 and the plate 47 are carrying out, with the sleeve 6, angular deflections in flapping and drag about the center of articulation of the laminated spherical stop 7. An angular play of a few degrees in drag and flapping, provided by the ball-joint, suffices to reduce very substantially the flexion and torsion stresses that can be undergone by the sections 38 and 37 of the connecting cable 31, due to the drag and flapping movements of the blades 3, and this results in a considerable extension of the service life of the cable 31.

The second section of cable 37 is substantially straight or slightly undulated (see FIGS. 2 to 4) and extends substantially on the upper face of the sleeve 6 up to its end 48, in the radially outer position, formed as a joint of varying cross section, located radially outside of the hook 40. The section of cable 37 has substantially the same shape of flattened rectangular cross section and the same non-armoured structure as the section 38, such that the central part of the section 37 is an elongated part, the largest dimension of its rectangular cross section being substantially perpendicular to the axis of rotation Z-Z, when the sleeve 6 is in the rest state. This section 37 does not extend radially over the sleeve 6, but in a direction inclined with respect to the longitudinal axis X-X of the sleeve 6, as shown in FIGS. 2, 3 and 4 such that its radially outer end 48 is offset laterally, on the side towards which the blade 3 is folded, and therefore on the side of the folding axis B-B with respect to the axis X-X. In the proximity of its radially outer end 48, the second section 37 is clamped between the sleeve 6 and a transverse brace 49 passing above the sleeve 6 and bolted at its ends on two fixing angle-bracket ends 50 each intended to be held by a spindle (not shown) on the respective one of two attachment forks 6e, protruding laterally outwards and on each side of the central part 6a of the sleeve 6, in order to attach to the latter the ball end-pieces of two drag dampers, whose other ends are attached to the sleeves 6 of the two adjacent blades 3, in an inter-blade configuration of the drag dampers, or to the hub 2 in a more conventional manner.

Thus, the section of cable 37 is maintained substantially flat on the top of the sleeve 6, to which it is tied at its inner end 42, by the articulated link 44 described above, and in the proximity of its outer end 48 by a second link, provided by the brace 49 and the said end-pieces 50 and by the retaining spindles in the forks 6e of the sleeve 6.

The end 48 of the section 37 is connected mechanically and electrically at one end 51, in the radially inner position, of the first section 36, which is a cylindrical end of circular cross section.

The first section of cable 36 connects the sleeve 6, to which it is bound by its inner end 51 and by the intermediary of the end 48 of the section 37, to the blade 3 whilst being connected, at its other end 52, in the radially outer position, to the connector 34 for connecting the de-icing cable 30. This first section 36 has a generally cylindrical shape of rounded cross section, preferably circular, and it is flexible, except possibly at its end 52 connected to the connector 34 and which can be armoured.

On the side of its inner end 51, the section 36 comprises a so-called "held" part 53 which, in any position of the blade 3 about the folding axis B-B, and therefore the folding pivot 14, is maintained above the bearing 5b of the mount 5 and the lateral fork 6b of the radially outer end of the sleeve 6, in an off-centered position with respect to the folding axis B-B, on the side towards which the blade 3 is designed to be folded.

This maintaining is provided by the fixing of the held part 53 of the section 36 on a cable support 54, which is tied to the folding pivot 14 such that during the operations of folding and deployment of the blade 3, by pivoting with the mount 5 about the folding pivot 14, the section 36 is driven by the blade 3 and deformed naturally by curving and moving in order to accommodate itself to the pivoting of the blade 3 with respect to the sleeve 6, without extension of this section 36.

The cable support 54 comprises a support spindle 55, mounted substantially coaxially about the geometric folding axis B-B, above and at the end of the folding pivot 14, and more precisely at the end of the pin 19 and of the centering pin 20 of the upper subassembly 14a of this pivot 14, whilst being held in a substantially axial direction with respect to the folding pivot 14, and a support arm 56, mounted in cantilever manner on the support spindle 55, by which the support arm 56 is connected to the folding pivot 14, this support arm 56 extending substantially in radial protrusion with respect to the geometric folding axis B-B on the side towards which the blade 3 is designed to be folded.

The support spindle 55 is a tubular item which comprises two cylindrical parts of circular cross section, in the axial projection of one another but separated by a collar 55a protruding radially outwards, and traversed by a same axial bore of constant diameter. One of these two parts is a lower part 55b, externally threaded and by which the support spindle 55 is engaged axially in the truncated cone-shaped end 19b of the pin 19 and screwed in the tapped bore of this truncated cone-shaped end 19c, in the place of the threaded plug such as the one 21 mounted in the pin 19 of the lower subassembly 14b of the folding pivot 14.

This lower part 55b of the support spindle 55 also replaces the threaded plug 21 in that it ensures the axial positioning of the pin 20 in the socket 19, whilst holding the shoulder 20b of the pin 20 bearing axially against the shoulder 19c of the socket 19. Also like the threaded plug 21, this lower part 55b is traversed, in the proximity of the collar 55a, by a diametral drilling 55d for receiving a safety pin such as the pin 28 which transversely traverses the threaded plug 21 and the truncated cone-shaped end 19b of the socket 19 of the lower subassembly 14b, such that the support spindle 55 is held axially and rotationally locked in the truncated cone-shaped end 19b of the pin 19 of the upper subassembly 14a by such a pin 28, also traversing aligned holes in the truncated cone-shaped end 19b or axial and diametrically opposed notches formed in that end 19b.

The other cylindrical part of the support spindle 55 is an upper part 55c, about which is engaged a ring 56a at the end of the support arm 56 in a radially inner position with respect to the folding axis B-B. The support arm 56 rests against the collar 55a and is held on the support spindle 55 by means of an annular washer 57, resting on both the upper end of the upper part 55c of the support spindle 55 and on the ring 56a of the support arm 56, and of a screw 58, whose head bears on the washer 57 and whose threaded shaft is screwed into the upper tapped part of the axial bore of the support spindle 55.

A cradle 59, shaped like a half-cylindrical recess, is formed in the lower face of the part 56b of the support arm 56 which protrudes in cantilever manner with respect to the support spindle 55.

The held part 53 of the section of cable 36 is engaged in this cradle 59 and held in position in the latter by a collar 60, which is disposed between the upper face of the upper fork 17 at the radially outer end of the sleeve 6 and the lower face of the cantilevered part 56b of the support arm 56, against which the collar 60 is fixed. This collar 60, having a half-cylindrical recess complementary to that of the cradle 59, is held up at its two ends against the sides of the cradle 59, on the lower face of the part 56b of the support arm 56, and is fixed in this closing position, ensuring the holding of the held part 53 of the portion of cable 36 between the cradle 59 and the collar 60, on each of the two sides of the cradle 59, by fixing components 61 such as rivets or screws (see FIGS. 3 to 5). The use of screws 61 or of other detachable fixing components is preferable, because the collar 60 is thus fixed in a detachable manner to the sides of the cradle 59, which facilitates maintenance operations. As a variant, the collar 60 can be fixed by one end only on one side of the cradle 59, on the support arm 56, the other end of the collar 60 then being held tight against the other side of the cradle 59 solely by the effect of the fixing element or elements 61 provided on just one side of the cradle 59.

By the tightening of the screw 58 against the washer 57 and its screwing in the support spindle 55, the support arm 56 can be fixed in a predetermined radial position with respect to the folding axis B-B, which preferably is the position shown in FIGS. 3 and 4, namely radially protruding in a direction substantially parallel with the longitudinal axis of the blade 3 in the folded position.

As a variant, the screw 58 and the washer 57 make it possible to mount the support arm 56 mobile in rotation about the upper part 55c of the support spindle 55, but in the initial position, which is the flight position (FIG. 3), the held part 53 of the portion of cable 36 is fixed on the support arm 56 oriented on the side of folding the blade 3.

Thus, during the folding of the blade 3 and of the mount 5 by rotation about the folding pivot 14, the section of cable 36 has its end 52 driven with the connector 34 on the blade 3, and naturally deforms by moving, changing from a shape in plan view which is curved with its concavity facing the folding axis B-B and counter-curved at its end part 52, in the flight configuration (see FIG. 3), into a shape curved in the opposite direction, with its concavity facing the folding side of the blade 3, when the latter is folded, as shown in FIG. 4. This reversal of curvature of the section of cable 36 between its held part 53, fixed on the support arm 56, and its end 52 is obtained without extension of this section of cable 36, when it accompanies the blade 3 in its rotation, due in particular to the holding of its held part 53 in an off-centered position with respect to the folding axis B-B on the folding side of the blade 3 in question.

Furthermore, in order to avoid any longitudinal slipping of the section of cable 36 with respect to the support arm 56 and the collar 60, during a rotation of the blade 3, the held part 53 of the section of cable 36 is delimited between two excess peripheral and radial thicknesses 62, spaced along the section of cable 36 and formed by over-mouldings of its outer cover.

As a variant, the arm 56 and the collar 60 are integrated with the section of cable 36 at the level of the held part 53, for example by over-mounding, and are thus integral with this section 36. The arm and the collar can thus form a single component, which is in one piece with the section of cable 36 and protruding laterally from the latter and which is fixed, for example by the screw 58 and the washer 57, such that it protrudes in cantilever manner from the support spindle 55.

The variant functions in the same way as that of the example described above.

The advantage of this device is that no excess length or loop has to be provided in the deployed position of the blade (FIG. 3) and that this device is very simple and is housed in the space adjacent to the actuator 10 without extending beyond it too substantially in height.

What is claimed is:

1. A rotary-wing aircraft rotor, of the type comprising:
   a hub, designed to be driven in rotation about an axis of the hub which is the axis of rotation of the rotor,
   at least two blades, each of which is connected to the hub by a link member that is substantially radial with respect to the axis of rotation, each blade being firmly connected by a root to a folding mount, mounted in a pivoting manner at a radially outer end of said link member, about a spindle for folding said blade between two positions, one of which is a flight position, in which said mount is attached to said link member in such a way that said blade is substantially aligned with the radial projection of said link member, and the other of which is a position folded along one side of the rotary-wing aircraft rotor, in which said mount and blade are pivoted about said folding spindle on one side of said link member, and
   an electrical connection installation comprising, for each blade, at least one electrical connecting cable connecting a first connector, carried by the hub and electrically connected on the hub, to a second connector on the blade and connected to at least one electrical device of said blade, wherein the connecting cable comprises a first flexible section, of essentially cylindrical shape with a rounded cross section, connecting said second connector to a second section, held on the corresponding link member, of said connecting cable, whose first section comprises a held part which, in all positions of the blade about the folding spindle, is maintained fixed on a cable support tied to said folding spindle, such that said held part is maintained above said mount and said radially outer end of said link member, in an off-centered position with respect to said folding spindle and substantially on the folding side of said blade, in order that the folding of the blade by pivoting about said folding spindle causes the first section of cable to curve and to move naturally in order to accommodate itself to said folding without extension of said first section of cable.

2. A rotor according to claim 1, wherein said cable support comprises a support arm, tied to said folding spindle, and extending in a substantially radially protruding manner with respect to said folding spindle and on the folding side of said blade.

3. A rotor according to claim 2, wherein said support arm is mounted in a fixed manner on said folding spindle.

4. A rotor according to claim 2, wherein said support arm is mounted in a pivoting manner on said folding spindle.

5. A rotor according to claim 2, wherein at least said support arm is integrated with the first section of cable at the level of the held part and is protruding laterally from said first section of cable, the support arm being tied to said folding spindle.

6. A rotor according to claim 3, wherein said cable support also comprises a support spindle, upon which the support arm is mounted in cantilever manner and which is mounted substantially coaxially at the end of the folding spindle, and held in a substantially axial direction with respect to said folding spindle, by at least one holding device.

7. A rotor according to claim 6, wherein the support spindle is partly engaged axially and held, at least axially, inside an upper tubular end of the folding spindle.

8. A rotor according to claim 1, wherein said held part of said first section of cable is held in a cradle, formed in said cable support, by at least one collar fixed to at least one side of the cradle and brought in the closed position onto an opposite side of the cradle, to which the collar is fixed, by at least one fixing element in a position of maintaining said held part between the cradle and the collar.

9. A rotor according to claim 8, wherein said cradle is formed in the lower face of said support arm, and the collar is disposed between the upper face of the radially outer end of said link member and said lower face of said support arm against which said collar is fixed.

10. A rotor according to claim 8, wherein said held part of the first section of cable is delimited by at least one radial excess thickness of said first section, preventing longitudinal sliding of said held part with respect to the cradle and the collar.

11. A rotor according to claim 1, wherein the second section of cable has an elongated part of substantially flattened rectangular cross section, maintained substantially flat on the top of said link member and extending in a direction laterally inclined with respect to the longitudinal axis of said link member, on the side of the folding spindle.

12. A rotor according to claim 1, wherein said second section of cable is connected to the first connector on the hub by a third section of the connecting cable, said third section comprising an overhead hook, in the shape of a flattened half-loop, of substantially flattened rectangular cross section whose largest dimension is substantially perpendicular to the axis of rotation, and whose concavity is facing substantially towards holding and articulation means connecting the corresponding link member to the hub, and substantially radially towards the axis of rotation, said overhead hook being deformable in flexion and torsion in order to accommodate itself to the angular deflections in pitch, drag and flapping of the blade and corresponding link member with respect to the hub.

13. A rotor according to claim 12, wherein the second section of cable is connected to the overhead hook of the third section of cable by a joint connected to the link member by a link which is articulated at least in pivoting manner about an axis substantially parallel with or slightly inclined with respect to the longitudinal pitch change axis of the link member and of the blade.

* * * * *